GAS ETCHING

Original Filed June 11, 1962 3 Sheets-Sheet 1

INVENTOR
Wilfred J. Corrigan
David L. Smith
BY
Mueller, Aichele & Rauner
ATTORNEY

GAS ETCHING

Original Filed June 11, 1962 3 Sheets-Sheet 2

INVENTOR
Wilfred J. Corrigan
David L. Smith

BY Mueller, Aichele & Rauner
ATTORNEY

GAS ETCHING

Original Filed June 11, 1962 3 Sheets-Sheet 3

INVENTOR
Wilfred J. Corrigan
David L. Smith

BY

Mueller, Aichele & Rauner
ATTORNEY

United States Patent Office 3,243,323

Patented Mar. 29, 1966

3,243,323
GAS ETCHING

Wilfred J. Corrigan, Scottsdale, Ariz., and David L. Smith, Sunnyvale, Calif., assignors to Motorola, Inc., Chicago, Ill., a corporation of Illinois Continuation of application Ser. No. 201,556, June 11, 1962. This application Sept. 1, 1965, Ser. No. 484,264
7 Claims. (Cl. 148—175)

This application is a continuation of application Serial No. 201,556 filed June 11, 1962, now abandoned.

This invention relates generally to the semiconductor art, and more particularly, it relates to the use of gas phase etching and cleaning treatments in the preparation of semiconductor material for use in transistors, diodes, and similar semiconductor devices.

One of the most frequent in-process requirements of germanium, silicon and other material from which semiconductor devices are manufactured is that this material be in the form of thin, flat, smooth pieces. Large crystals of semiconductor material are usually, therefore, diamond sawed into wafers and the wafers lapped, mechanically polished and/or etched chemically or electrochemically to a final or near final dimensional specification.

The mechanical operations of sawing, lapping and polishing are responsible for a certain amount of surface and shallow subsurface damage to the wafers, and the etching operations on the wafers are to remove this damaged material. Unfortunately, the character of semiconductor material is such that using ordinary etching methods the material initially etches much more rapidly at scratches or deeply damaged regions and considerable additional etching may be necessary if the irregularly etched regions so occurring are to be removed.

Conventional liquid phase etching using chemical or electrochemical methods leave much to be desired apart from their action on the semiconductor material. Etching residues are frequently difficult to remove from the surfaces of the semiconductor material, and these residues often have decidedly degrading effects on devices fabricated from this material.

In addition to the effect on the electrical character of semiconductors many processing operations can not be optimized when the surfaces of the semiconductor material are not extremely clean. A typical example would be in solid state diffusion where wafers of semiconductor materials are heated, usually in a furnace or equivalent apparatus, in the presence of certain other materials referred to as impurities. Under these conditions the impurities are caused to migrate inwardly from the surfaces of the wafers and to become distributed within the wafers. The actual laws governing the distribution of impurities in the wafers as a result of diffusion are not directly important to this description, but the character of the surface influences the rate at which impurities enter the wafers. The purpose of diffusion is to distribute the impurities in a particular manner usually with respect to distance measured inwardly from the surface of the wafer. When the character of a surface is such that the rate at which impurities enter this surface varies somewhat across the surface, the distribution of impurity will be less uniform than in the case where the rate is constant across the surface and this may be undesirable. This rate is most easily made constant by simply forming a clean, bare surface.

Thin films of metallic oxide that are deposited or otherwise formed on silicon or germanium substrates lack uniformity when the substrates are not extremely clean. These films may be formed by such well known techniques as oxidizing the surface of a silicon substrate to form a layer of silicon dioxide, evaporating or sputtering the oxides or depositing them by any of a number of chemical ways utilizing pyrolysis or hydrolysis of certain compounds. The lack of uniformity is particularly noticeable in the case where an electrical component such as a capacitor having a thin film of silicon dioxide or other oxide as a dielectric is fashioned directly on the surface of a wafer of silicon or germanium. Specks of dust and residues on the substrate tend to interrupt, deform and contaminate the films, and capacitors using such dielectrics frequently do not meet specifications. Precleaning the substrate under conditions so that it is kept clean and dust free seems an obvious solution to the problem; however, in the past scrupulously clean surfaces have not been easy to attain or preserve prior to forming the oxide films.

Another example of a process requiring a clean surface is a reduction method of growing an epitaxial film of semiconductor material on the surface of a substrate of monocrystalline semiconductor material. In this epitaxial process, the vapor of a source material such as silicon tetrachloride is mixed with hydrogen and caused to flow over the heated surface of semiconductor material such as silicon. The silicon tetrachloride is reduced by the hydrogen to form silicon and hydrogen chloride gas on contacting the hot substrate. The silicon from this reaction deposits on the surface of the silicon substrate, and a monocrystalline film of silicon grows epitaxially on the substrate; that is, the film has the same crystalline structure as the substrate by virtue of the orienting influence of the substrate which aids in causing the newly available atoms of the reaction to assume those positions of lowest energy. Where the surfaces are dirty, satisfactory epitaxial growth does not occur. This is generally true for both germanium and silicon epitaxial layers regardless of choice of substrate or epitaxial source material.

Even when semiconductor material has been well cleaned, contamination is still a problem. The simple act of handling a wafer of semiconductor material, regardless of how carefully, may cause a dirty surface. Small specks of dust and other material may settle on a wafer of semiconductor material so that when epitaxially processed, for example, regions of poor or discontinuous growth occur.

A similar problem can even occur within the closed reaction chamber used for growing epitaxial films. For example, one of the problems in growing a film of silicon on a silicon substrate is that bits of material that have deposited on the reaction chamber flake off and settle on the silicon. Unsatisfactory growth results at the points on the silicon substrate covered by these bits of material.

The reaction chambers used in epitaxially growing germanium and silicon for example, are usually of fused quartz, or some material composed partially of silica. The fact that, as previously mentioned, silicon or germanium ordinarily deposits on the chamber walls has led to the general conclusion that these materials tend to deposit on silicon dioxide as well as silicon and germanium substrates. There is a definite need for a masking material that could be used in localizing epitaxial growth to certain well defined regions on a semiconductor substrate. This type of masking material is frequently a film of material that resists or inhibits certain operations; a surface covered with such a film having openings at definite locations would be expected to allow processing to occur at these definite locations while preventing or inhibiting its occurrence at all places covered by the film. Thin film silicon dioxide is well known as a mask or resist for localizing certain other processing operations in semiconductor fabrication but has been rejected as a mask for this purpose in epitaxial growth due to the apparent fact that these semiconductor films deposit on silicon dioxide. If, however, silicon dioxide could be utilized as a mask against epitaxial growth, the considerable technology available for using silicon dioxide for other masking purposes could be readily adapted for epitaxial purposes.

It is also worth noting that, if silicon dioxide could be used for masking against epitaxial growth, a number of new type semiconductor devices are immediately possible.

Accordingly, one of several objects of this invention is to provide a method of etching semiconductor wafers without disturbing the flatness attained by mechanical operations such as lapping and polishing.

Another object of this invention is to provide a method for etching semiconductor material that leaves little if any residues on the etched surfaces.

An additional object is to provide a method for in situ cleaning of semiconductor material in a diffusion apparatus or an epitaxial growth reaction chamber, or oxide growth apparatus so that no extraneous material is on the semiconductor surface during the processing.

A further object of the invention is to provide a method for adapting silicon dioxide films as masks against epitaxial growth and thereby making possible semiconductor devices of a type not formerly possible by known means.

Still another object of this invention is to provide means that, when used with epitaxial growth, it is no longer necessary to keep reaction chamber walls cool so that combustion tube type and similar type furnaces may be used for growing epitaxial material.

A feature of this invention is a method of etching germanium and silicon using vapor phase materials so that the tendency for etching to occur preferentially at exposed damaged regions and imperfections is greatly reduced.

Another feature of this invention is the use of vapor phase etch-cleaned silicon dioxide films as masks to limit the growth of epitaxial material on silicon and germanium to defined regions of the germanium and silicon.

Yet another feature of this invention is the use of vapor phase etching in conjunction with silicon dioxide films to prepare new and unusual semiconductor device structures.

In accordance with this invention ,silicon and germanium material may be etched in a very uniform manner by heating the material uniformly above 700° C. for germanium and 850° C. for silicon in the presence for gas phase hydrogen chloride. The upper limit of the temperature is the melting point of the material being etched.

Silicon dioxide may be treated by heating it in gas phase hydrogen chloride. After this treatment, silicon dioxide will no longer support the nucleation and growth of germanium and to a lesser extent, this is true for silicon. Thus, the walls of epitaxial growth reaction chambers, typically of quartz, may be kept nearly free of undesirable formations that tend to fall upon substrate material to the detriment of epitaxial film quality.

Applied to thin silicon dioxide films on germanium or silicon, the treatment allows silicon dioxide films to be used as a resist or mask against epitaxial growth. By providing openings in the film before exposure to the gas phase hydrogen chloride treatment epitaxial growth may be delimited to the open regions and little or no silicon or germanium deposits on the silicon dioxide.

Since the substratum exposed by the openings in the silicon dioxide film may be etched in depth within the area of the openings and then backfilled with epitaxially grown material, a good amount of three dimensional geometry control of epitaxal growth is obtained.

The accompanying drawings and the following text describe the invention in detail and the use of typical processing equipment associated with it.

Figure 1:
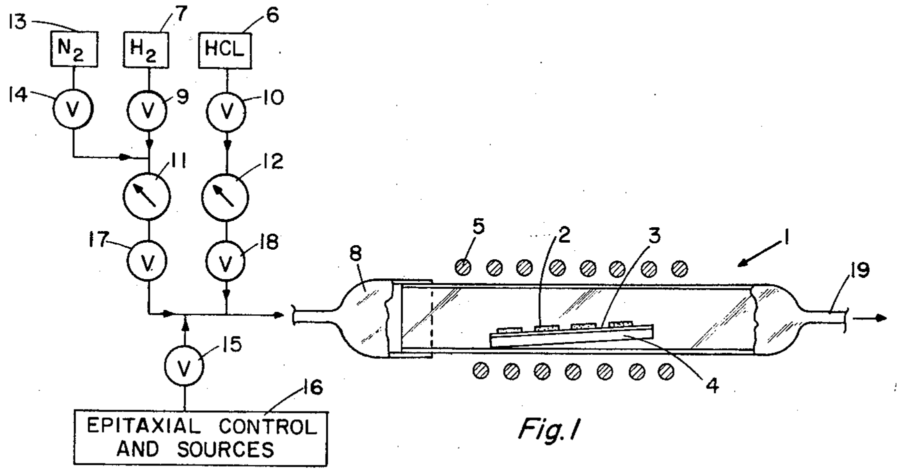
FIG. 1 is a schematic drawing of apparatus suitable for both gas phase etching and epitaxial growth.

FIG. 1 is a schematic drawing of an epitaxial growth system which is equipped to allow gas phase hydrogen chloride to be introduced into the system. The system is suitable for use for etching wafers of germanium and silicon with gas base hydrogen chloride, and for growing epitaxial layers on such wafers.

The system consists of a reaction chamber 1, typically of quartz. Germanium or silicon wafers 2 are shown upon a slab 3 of quartz which rests upon a susceptor 4 of graphite or molybdenum.

The susceptor 4 is heated by radio frequency energy from the inductor coil 5 which is energized by an induction heating oscillator (not shown). The germanium or silicon material is heated largely by the susceptor although there is increased direct heating of the material by induction after the material is hot.

When using the system for gas phase hydrogen chloride processing, dry vapor phase hydrogen chloride from the supply tank 6 and hydrogen from its supply 7 flow into the reaction chamber 1 through the removable entrance cap 8. The flow rates of the hydrogen and hydrogen chloride and relative proportions of these gases are controlled with the aid of valves 17 and 18 and flow meters 11 and 12. A nitrogen supply 13 is available for purging the system of air before introducing hydrogen or hydrogen chloride into the reaction chamber. Purging should be done routinely to prevent explosion. When purging, the nitrogen valve 14 is open to the reaction chamber allowing nitrogen to flow through for several minutes.

The hydrogen chloride supply 6 and the hydrogen-nitrogen supplies 7 and 13 are equipped with shut off valves 10, 9, and 14 so that these gases may be turned off without changing the control valve 17 and 18 settings. The valve 15 isolates the epitaxial controls and sources 16 when they are not being used.

After purging, to etch germanium, germanium wafers 2 are heated in the reaction chamber above 700° C. but below the germanium melting point in the presence of vapor phase hydrogen chloride. The temperature is measured with an optical pyrometer.

For silicon the wafer temperatures are above 850° C. to the silicon melting point.

The vapor phase hydrogen chloride is diluted to the proper concentration by mixing it with hydrogen gas. The mixture of the two gases is allowed to flow over the wafers which are etched by the hydrogen chloride.

Volatile products are formed and are swept through the reaction chamber by the gas stream and out the burn off vent 19 where the gases are then conducted to a burner (not shown) where they are mixed with air and burned. The products of this burning are then disposed of by venting to the outside atmosphere.

After etching, the wafers may be removed from the reaction chamber but if the wafers are to be used as epitaxial substrate material, they are usually left undisturbed in the reaction chamber, in a hydrogen atmosphere.

Epitaxial layers may be grown on the wafers 2 by heating the wafers and allowing a gaseous mixture of hydrogen and a chloride compound of the appropriate semiconductor material to flow over the exposed surfaces of the wafers. The chloride compound may be silicon tetrachloride, germanium tetrachloride, or trichlorsilane, for example. The temperature of the wafers may be 700–850° C. for germanium and 1000–1300° C. for silicon. The gaseous materials tend to react preferentially at the exposed wafer surfaces causing a layer of monocrystalline semiconductor material to grow on these surfaces in the same crystalline orientation. In order to dope the epitaxial material while it grows, a hydride compound of a doping impurity may be added to the gaseous materials. Suitable hydride compounds are phosphine, diborane and arsine. The epitaxial growth and doping processes may be controlled very accurately so that these grown or epitaxial layers may be formed to tightly limited impurity concentrations or doping levels and to closely toleranced thicknesses.

One of the problems in obtaining high quality epitaxially grown material is the fact that small amounts of the silicon or germanium, that form on the walls of the reaction chamber and on objects other than wafers 2 within the reaction chamber, tend to flake away and settle on the wafers and cause pitted or spotted regions of poor or interrupted epitaxial material.

However, by exposing quartz reaction chambers and quartz objects used within the reaction chamber to vapor phase hydrogen chloride at high temperatures, the subsequent germanium and silicon formation and growth on quartz during epitaxial processing is greatly reduced. Since there are vastly fewer flakes or specks of material to settle on the wafers, the quality of the epitaxial material is improved as a result.

The quality of the epitaxial material is also improved in another way as an indirect result of this hydrogen chloride treatment of quartz. The reaction chamber of epitaxial systems of the type in FIG. 1 is quartz and is equipped with an induction means of heating the susceptor plate and the wafers. The reason for this is to minimize deposition on chamber walls as quartz is not directly heated by induction and there is generally less depositioin on cooler surfaces. Induction heating methods and optical pyrometry do not allow the same fineness of temperature control as may be obtained with other methods, such as combustion tube furnaces and thermocouple type control systems, for example. With hydrogen chloride treated quartz reaction chambers, the method of heating and control is not limited to induction heating and optical pyrometry. The rate of growth and other epitaxial characteristics are temperature dependent, so that epitaxial material may be made more uniform as a result of improved reaction chamber temperature control.

A most important consequence of the gas phase hydrogen chloride treatment of quartz was that the same treatment on other forms of silicon dioxide yielded the same result.

When wafers of germanium and silicon were treated so that thin films of silicon dioxide covered parts of the wafer surface but not others and then these wafers were gas phase hydrogen chloride etched and epitaxially processed, it was observed that the silicon dioxide films masked against epitaxial growth as well as etching so that the processing could be delimited to those regions of the wafers not covered with the silicon dioxide film.

Previously, epitaxial device geometry has been controlled by first growing an epitaxial film and then etching it to a desired shape. Using a silicon dioxide film as a resist againsct hydrogen chloride etching of the germanium or silicon substrate and as a resist against epitaxial growth, a considerable degree of three dimensional control of epitaxial growth is possible. The treatment of silicon dioxide films with gas phase hydrogen chloride so that they resist epitaxial frowth and the use of these films as gas phase etching and epitaxial film masks allows new and unusual semiconductor devices to be made. FIGS. 2 through 9 illustrate device fabrication methods in which gas phase hydrogen chloride treatments and masking techniques are used advantageously.

Figure 2:
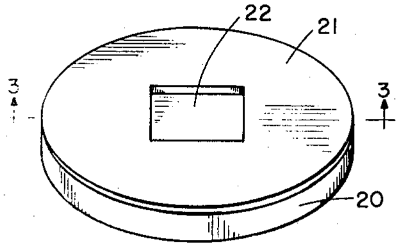
FIG. 2 is an isometric drawing of a silicon dioxide covered wafer of semiconductor material showing a rectangular opening in the silicon dioxide.

FIG. 2 is a wafer of germanium 20 with a thin film 21 of silicon dioxide on its upper surface. A rectangular "window" 22 has been removed from the silicon dioxide film by methods well known to the art. Such methods include etching out the silicon dioxide window with diluted hydrofluoric acid, the balance of the silicon dioxide being protected by being covered with a hydrofluoric acid resisting material.

Figure 3:
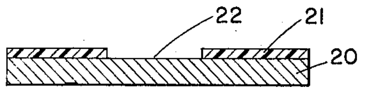
FIG. 3 is a section through the wafer of FIG. 2 taken along line 3—3.

A section through the wafer 20 at 3—3 is shown in FIG. 3. At this stage, the germanium 20 has not been etched; only the window 22 in the silicon dioxide film 21 has been etched.

Figure 4:
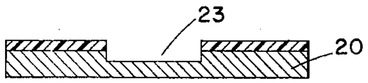
FIG. 4 is the same section with a cavity etched in the material.

In FIG. 4 a cavity 23 has been etched in the germanium 20. This cavity has been formed by exposing the wafer to a flowing mixture of hydrogen chloride gas and hydrogen gas while heating the wafer above 700° C.

Figure 5:
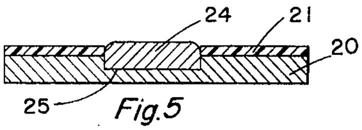
FIG. 5 is the section after the cavity has been filled with epitaxially grown material.

In FIG. 5 the cavity 23 of FIG. 4 has been filled in with epitaxially grown germanium 24. Since the silicon dioxide was exposed to the hydrogen chloride gas while hot, no germanium material has formed on the film 21. A simple epitaxial diode results when the wafer 20 is of a conducting type opposite to that of the epitaxial material 24. Since the etching of the cavity 23 and the filling of it with epitaxial material 24 may be accomplished without removal from the epitaxial reaction chamber 1, the junction 25 between the two types of germanium may be kept very clean.

Figure 6:
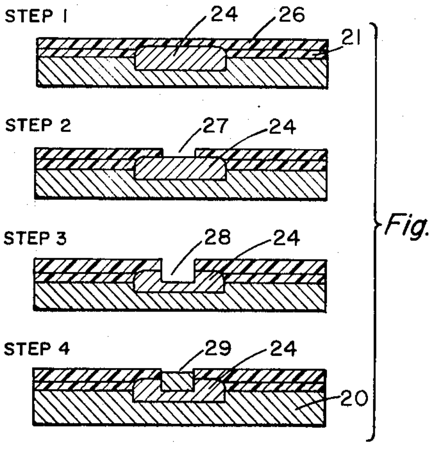
FIG. 6 illustrates further processing steps to prepare a transistor structure from the structure of FIG. 5.

FIG. 6 shows how the structure of FIG. 5 may be additionally processed to form a transistor structure by epitaxial means. In step 1 a new silicon dioxide film 26 is grown over the old silicon dioxide film 21 and the epitaxially grown germanium. In step 2 a window 27 of silicon dioxide has been removed from the top of the epitaxial material. In step 3 the epitaxially grown material 24 has been etched with gas phase hydrogen chloride to form a cavity 28. In step 4 the cavity has been back filled with epitaxial material 29 of opposite conductivity type as the new epitaxial material so that a transistor like PNP or NPN structure is shown.

Figure 7:
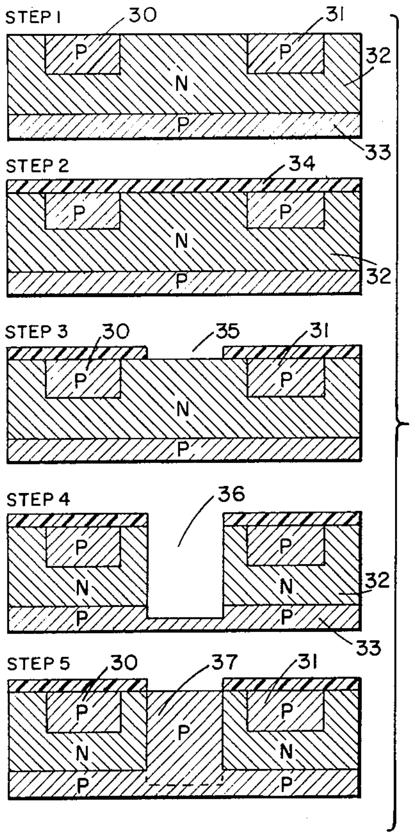
FIG. 7 illustrates steps in a procedure for electrically "isolating" certain regions on a wafer of semiconductor material.

If two diode-like structures 30 and 31, for example, are formed in the same semiconductor substrate as shown in step 1 of FIG. 7, it is possible to "isolate" them with high resistivity epitaxial material so that, although physically connected, the electrical connection between them is very highly resistive. Such isolation techniques are readily useful in the fabrication of electrical circuits on semiconductor substrates. In step 1 of FIG. 7 the two P regions 30 and 31 have been formed on a common section 32 of N-type semiconductor material which was in turn on a section of high resistivity P-type material 33. In step 2 the top surface of the N and P sections has been coated with silicon dioxide 34. In step 3 a region 35 of silicon dioxide between the P sections 30 and 31 has been removed. In step 4 a deep cavity 36 has been etched through the N section and into the lower P region 33 by exposing the material to gas phase hydrogen chloride in the manner described previously. In step 5 high resistivity P-type material 37 has been epitaxially grown in the cavity so that the PN junction under the P material 30 is "isolated" from the PN junction under the P material at 31.

Figure 8:
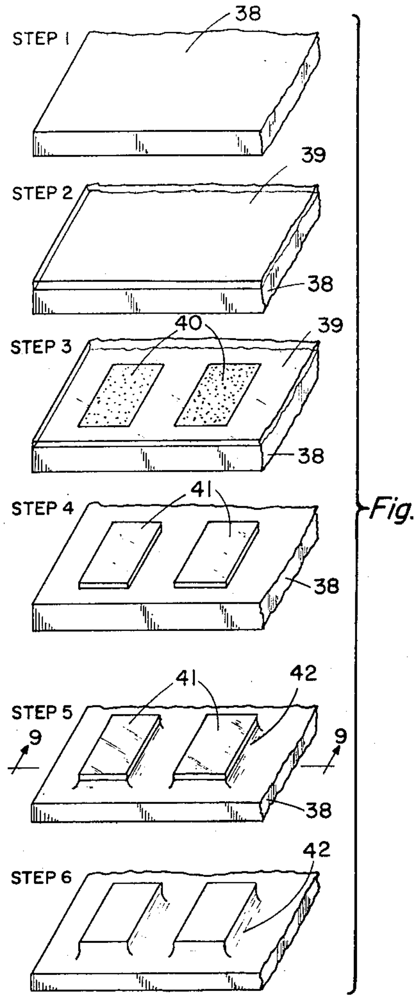
FIG. 8 is the application of gas phase etching to the preparation of mesa type transistors.

Some of the valuable uses of silicon dioxide masking and gas phase etching may not involve the growth of epitaxial germanium or silicon. The masking and etching technique is very useful for preparing clean accurate junctions of the etched type such as mesa transistor collector junctions. FIG. 8 illustrates the steps in preparing the collector junctions. Step 1 shows a portion of a wafer of germanium or silicon before the mesa forming operations have begun. Step 2 shows a wafer after a film of silicon dioxide has been deposited on the wafer 38. Step 3 shows the wafer 38 with silicon dioxide 39 and an hydrofluoric acid resisting material in place. Step 4 shows the wafer after etching the silicon dioxide in hydrofluoric acid and after the resist material has been cleaned off the remaining silicon dioxide 41. Step 5 shows the wafer 38 after etching with gas phase hydrogen chloride showing the mesas 42 beneath the silicon dioxide 41. Step 6 shows the wafer 38 and mesas 42 after the silicon dioxide has been removed by exposure to hydrogen fluoride vapor, for example. An exposure to hydrogen fluoride vapor in fairly high concentration would not be done in the quartz reaction chamber 1 as the chamber itself would soon be etched away; in this case, another chamber (not shown) of polyethylene is suitable for this particular step. However, advantage may be taken of the fact that hydrogen chloride reacts more rapidly with silicon dioxide as the temperature is increased; hydrogen fluoride vapor in high dilution with hydrogen may be used by heating the wafers to about 100° C. to increase the reaction rate at the surfaces of the wafers, and in this manner, the quartz reaction chamber may be used as it is only lightly etched since it is not heated. After the collector area has been established by etching, the devices are "clean" since the etching products are volatile.

Specific embodiments for gas phase processing according to the invention are given for germanium and for silicon. The operating procedures for etching germanium and silicon are very similar and the same basic equipment may be used for either material.

To perform planar etching which is to finish etching with a very flat surface on a wafer of silicon or germanium, it is necessary to start with a crystal wafer that has first been lapped and/or polished to the degree of flatness and finish desired and this degree of flatness remains relatively unaltered with proper application of gas phase hydrogen chloride etching. The finish or polish is generally improved, if not preserved.

After the wafers have been lapped or polished, they are vapor degreased with trichlorethylene, washed in alcohol and wiped dry with cotton.

The clean wafers are placed upon a clean plate of fused quartz 3 which covers a graphite susceptor 4. The graphite is about ⅜" x 2" x 8" and the quartz covering is about 1/16 inch thick.

After loading with wafers, the quartz and susceptor are placed in the coil wrapped region of the reaction chamber 1. A quartz rest (not shown) is provided in the reaction chamber which maintains the susceptor and plate at about a 6° angle with the long axis of the reaction chamber as shown in FIG. 1. It has been found that this slight angle promotes a more uniform etching action and additionally a more uniform growth of epitaxial material.

After loading, the end bell 8 is replaced on the reaction chamber 1 to seal the system. The air is removed from the reaction chamber 1 by flushing dry nitrogen through it. The reaction chamber is typically 74 mm. inside diameter and about 1 meter long and is well purged by a nitrogen flow of 6 liters per minute for 3 minutes.

The hydrogen flow is started immediately after valving off the nitrogen. In this embodiment for silicon, the flow is typically 32 liters per minute. For germanium the flow is 25.4 liters per minute.

The RF generator is turned on to heat the susceptor 4 and the wafers 2. The wafers are brought to temperture and then the hydrogen chloride gas is introduced. A suitable temperature for silicon is 1200° C. and for germanium it is 900° C.

The hydrogen chloride gas is introduced into the reaction chamber to start the etching action. The hydrogen chloride flow for silicon etching is 500 cc. per minute, and for germanium the flow is 1.4 liters per minute.

Based on the above flow rates for hydrogen chloride gas and hydrogen gas, the gaseous mixture consists of from 1.5% to 5.4% by volume of hydrogen chloride and from 94.6% to 98.5% by volume of hydrogen gas. Under the above conditions the silicon etches at a rate of approximately 0.3 microns per minute and the germanium at a rate of 1.0 microns per minute.

After enough material has been etched from the wafers, the action is stopped by slowly turning down the RF power to allow the wafers to cool. The hydrogen chloride and hydrogen gas are then turned off in this order and nitrogen is then flushed through the reaction chamber. After about 3 minutes or more, the end bell may be removed and the etched wafers removed, if desired.

If an epitaxial film is desired on the whole upper surface of the wafers, the procedure is somewhat different in that the hydrogen chloride is valved off and the system flushed with hydrogen gas for about 2 minutes and then epitaxial growth is commenced as described in the previously cited copending applications.

When silicon dioxide masking is used to localize etching and/or epitaxial growth the procedure is to cover the surface of the wafers with a thin film of silicon dioxide. The wafers may be pre-etched with gas phase hydrogen chloride before putting on the oxide but this is optional. Any of the known methods for forming silicon dioxide films may be used providing the film is anhydrous, dense, continuous, and more than 1000 angstrom units thick. For example, a silicon dioxide film may be formed on silicon by oxidation in an atmosphere of oxygen or water vapor at 750° C.–1200° C. A silicon dioxide film may be formed on silicon or germanium by hydrolysis of silicon tetrachloride vapors.

The regions of the wafer to be processed are exposed by etching away the silicon dioxide at these regions. This is often done by having the silicon dioxide, except at these regions, covered with a resist that is not attacked by hydrofluoric acid and then placing the wafer in diluted hydrofluoric acid to etch away the exposed silicon dioxide.

Following this the wafer is rinsed, dried and the resist is removed by an appropriate method. The wafer is then thoroughly cleaned.

The wafers are placed in the reaction chamber as previously described for etching with this embodiment. From this point on the procedure is the same as for etching an unmasked wafer. The flow rates and temperatures are also the same.

After etching to the desired depth, the cavities may be filled with epitaxially grown silicon or germanium, if desired. By the use of these embodiments, the device structures illustrated by FIGS. 3 through 9 and similar structures may be fabricated.

Figure 9:
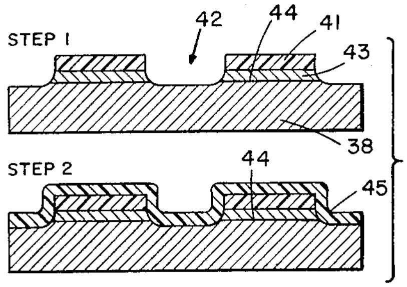
FIG. 9 represents the silicon dioxide coating of a mesa junction exposed by hydrogen chloride gas phase etching.

Since hydrogen chloride gas phase etching is a very clean process, it would be very worthwhile if the exposed regions of semiconductor device junctions could be protected with a film of silicon dioxide before removing the freshly etched material from the etching reaction chamber 1. FIG. 9, in which step 1 is a sectional view of step 5 of FIG. 8, represents an alternative method of treating a mesa device. In FIG. 9, step 1 the wafer 38 is shown with the mesa 42 covered at the top with silicon dioxide 41. Usually on a mesa structure, there is a region of semiconductor material 43 of opposite conductivity type so that a PN junction 44 exists. In step 2 a film of silicon dioxide 45 has been formed over the surfaces of the wafer so that the junction 44 is not exposed. This silicon dioxide may be placed or caused to form on the wafer, without removing it from the reaction chamber by several means. One method is by introducing moisture into the reaction chamber in the case where wafers are of silicon. This is accomplished after shutting off the hydrogen chloride by bubbling hydrogen through water to saturate it before allowing it to enter the reaction chamber.

Figure 10:
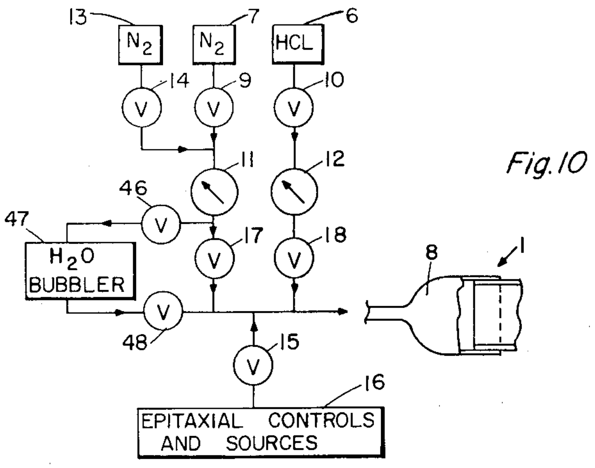
FIG. 10 is the apparatus of FIG. 1 modified so that silicon oxide films may be formed on silicon with its use.

The apparatus shown in FIG. 10 is a modified form of that shown in FIG. 1. The modifications consist of the addition of an ordinary laboratory bubbler 46 and the valves 47 and 48 across the hydrogen valve 17.

After hydrogen etching, if a film of silicon dioxide is desired, the silicon wafers are kept hot by keeping on the RF power. The hydrogen chloride shut off valve 10 is closed and the reaction chamber 1 is flushed with hydrogen gas. Bubbler valves 47 and 48 are opened and the hydrogen valve 17 is closed so that hydrogen bubbles through water in the bubbler 46 before entering the reaction chamber. The hot silicon dioxide is formed on their surfaces while they are in the reaction chamber so that the cleanliness of the hydrogen chloride treated junction is preserved.

Figure 11:
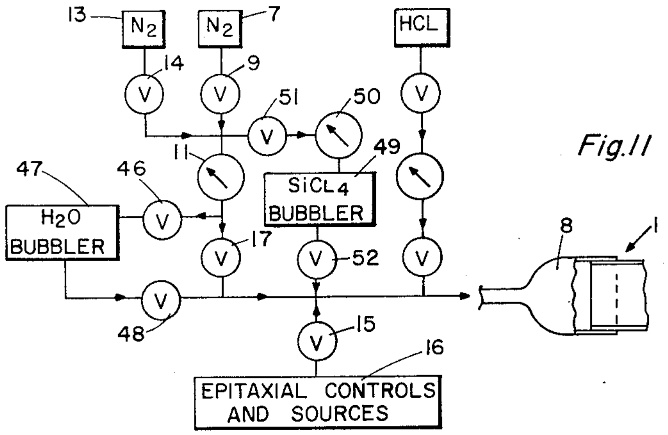
FIG. 11 is the apparatus of FIG. 10 modified so that different types of oxide films may be formed on silicon and germanium.

Silicon dioxide and other metallic oxide films are also readily deposited in situ following gas phase hydrogen chloride etching of the semiconductor wafers after further modifying the apparatus of FIG. 10 to make FIG. 11 by adding a supply source of metallic halide vapor, for example. Silicon dioxide films, which are particularly useful, may be deposited at low temperatures on silicon and germanium wafers by exposing them to the vapor of silicon tetrachloride under suitable conditions. In FIG. 11, a bubbler 49 of silicon tetrachloride, flow indicator 50, metering valve 51 and shut off valve 52 have been added to the apparatus of FIG. 10. After silicon or germanium have been etched in the apparatus and allowed to cool, the reaction chamber is purged with nitrogen for a few minutes and then valve 17 is closed and the two valves 46 and 48 to the water bubbler 47 are opened to cause water saturated nitrogen to enter the reaction chamber. The silicon tetrachloride shut off valve is opened and silicon tetrachloride saturated nitrogen is formed by metering nitrogen with the aid of the metering valve 51 and flow indicator 50 through the silicon tetrachloride bubbler 49. The silicon tetrachoride vapor and water vapor are carried to the reaction chamber where the water is adsorbed by the wafer surface and the silicon tetrachloride is hydrolyzed by this water so that silicon dioxide is formed on the surface of this water. The rates of silicon dioxide formation may be increased by heating the wafers ot some temperature below 200° C., but if the wafers are heated to too high a temperature, the adsorbed water is driven from the surface and the reaction will not occur properly. The mechanics of this kind of process are discussed more fully in the copending application of David R. Peterson, Serial No. 195,630, filed on May 17, 1962, and assigned to the present assignee.

Figure 12:
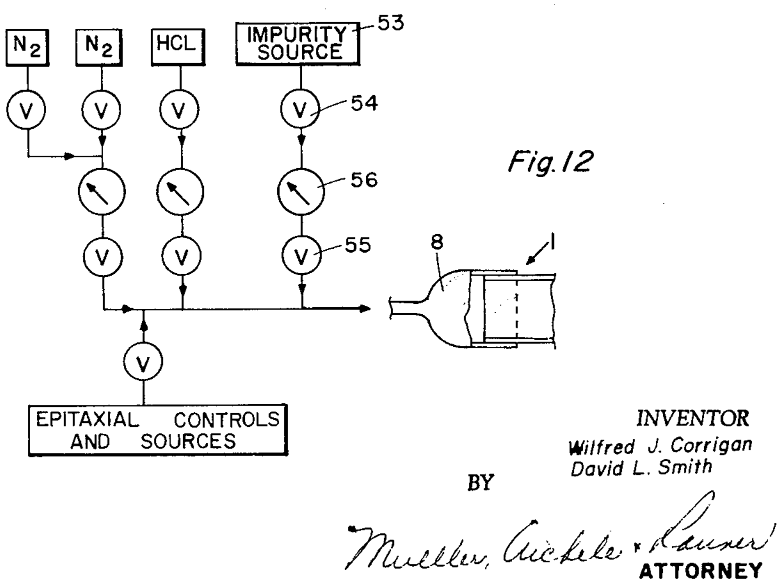
FIG. 12 is the apparatus of FIG. 1 modified so that solid state diffusion may also be performed with the aid of the apparatus.

Gas phase hydrogen chloride etching is also useful as a pretreatment for semiconductor material immediately prior to and occasionally following solid state diffusion operations. These operations may usually be accomplished in the same apparatus in which diffusion is performed. FIG. 12 shows the apparatus of FIG. 1 but additionally equipped with a pressure supply tank 53 of impurity source material, valves 54 and 55 and a flow meter 56 so that the impurity source material may be metered into the reaction chamber 1 to blow over hot wafers 2 and alter their characteristics by solid state diffusion of the impurity from the impurity source material into the wafers. When gas phase hydrogen chloride etching is done immediately prior to diffusion, the surface is extremely clean and ideal for diffusion since the rate at which the impurity will enter the wafers at the surface is the same across the whole surface when the surface is everywhere of the same material, that is, free of foreign material. Additionally, the high concentration of impurity existing on a surface may be lowered by gas phase hydrogen chloride etching of the surface, thereby removing the portion of the surface having the high concentration of impurity and leaving a new surface of some lower concentration. This is useful in that it allows alteration of the electrical resistivity, breakdown, surface recombination velocity and other characteristics of the surface.

The operating conditions of the embodiments are believed to be optimum or nearly optimum, and under the conditions cited, germanium and silicon may be etched with considerable accuracy while maintaining a high degree of flatness and surface perfection. The flatness is undisturbed except at the extreme edges; these edges become slightly rounded. The surface roughness is about 0.2 micron peak to valley. Within a number of wafers (up to 40) etched at the same time, the variation in the change of thickness due to etching is 3% or less. The variation in this change from one group of wafers etched under these conditions compared with the variation from another group under the same conditions is 5% or less.

Satisfactory etching, including planar etching may be accomplished over quite a range of temperatures, hydrogen chloride concentrations, and gas flow rates. These conditions are given in Table 1. The hydrogen chloride concentration is the percentage in a hydrogen chloride and hydrogen gas mixture. The flow rate is given as "Superficial Gas Velocity" which is obtained taking the total flow rate of the hydrogen chloride and hydrogen gas mixture and dividing it by the cross section of the reaction chamber at the location where gas etching takes place.

TABLE 1

| Conditions | Germanium | Silicon |
|---|---|---|
| Temperature, ° C | 760–945 | 900–1,435 |
| HCl Concentration, percent | 0–100 | 0–100 |
| Superficial Gas Velocity, cm./sec | 0.3–25 | 0.3–25 |

Under these conditions etch rates for germanium and silicon may be made to vary from 0–10 mils per minute.

It is apparent that the invention (1) provides a means for etching germanium and silicon with a high degree of control and without contamination; (2) by its action on quartz equipment permits epitaxial material of improved quality to be grown; (3) used with silicon dioxide masking it permits localized etching of germanium or silicon; (4) by its action on silicon dioxide facilities localizes epitaxial growth on germanium or silicon; (5) makes new semiconductor device structures possible; and (6) provides a means of improving certain existing semiconductor processes.

We claim:

1. A method of preparing semiconductor material, including the steps of:

(a) placing a crystal element of the semiconductor material selected from the group consisting of silicon and germanium on a planar support, (b) positioning said support in a closed reaction chamber, (c) heating said crystal element at a temperature below the melting point thereof and above a minimum temperature which is 700° C. in the case of germanium and 850° C. in the case of silicon, (d) passing a mixture consisting essentially of hydrogen gas and a minor proportion of gaseous hydrogen chloride over said heated crystal element to etch the surface thereof, (e) stopping the flow of gaseous hydrogen chloride, and (f) without removing said crystal element from said chamber, passing a gaseous compound over said crystal element.

2. A method of preparing semiconductor material, including the steps of:

(a) placing a crystal element of the semiconductor material selected from the group consisting of silicon and germanium on a planar support, (b) positioning said support in a closed reaction chamber, (c) heating said crystal element at a temperature below the melting point thereof and above a minimum temperature which is 700° C. in the case of germanium and 850° C. in the case of silicon, (d) passing a mixture consisting essentially of hydrogen gas and a small percentage of gaseous hydrogen chloride over said heated crystal element to etch the surface thereof, (e) stopping the flow of gaseous hydrogen chloride, and (f) without removing said crystal element from said chamber, passing a gaseous compound of the semiconductor material over said crystal element to thereby grow an epitaxial semiconductor layer on said surface.

3. A method of preparing semiconductor material, including the steps of:

(a) placing a crystal element of the semiconductor material selected from the group consisting of silicon and germanium on a planar support, (b) positioning said support in a closed reaction chamber, (c) heating said crystal element at a temeprature below the melting point thereof and above a minimum temperature which is 700° C. in the case of germanium and 850° C. in the case of silicon.

(d) passing a mixture consistign of from 1.5% to 5.4% by volume of gaseous hydrogen chloride and from 94.6% to 98.5% by volume of hydrogen gas over said heated crystal element in said chamber thereby causing an etching reaction between the hydrogen chloride and the surface of the semiconductor material, (e) stopping the flow of gaseous hydrogen chloride, and (f) without removing said crystal element from said chamber, passing a gaseous compound of the semiconductor material over said crystal element to thereby grow an epitaxial semiconductor layer on said surface.

4. A method of preparing semiconductor material, including the steps of:

(a) placing a plurality of crystal elements of the semiconductor material selected from the group consisting of silicon and germanium on a planar support, (b) positioning said support in a closed reaction chamber at an acute angle with respect to a gas flow path through said chamber, (c) heating said plurality of crystal elements at a temperature below the melting point thereof and above a minimum temperature which is 700° C. in the case of germanium and 850° C. in the case of silicon, (d) passing a mixture consisting of from 1.5% to 5.4% by volume of gaseous hydrogen chloride and from 94.6% to 98.5% by volume of hydrogen gas along said flow path and over said heated crystal element in said chamber thereby causing an etching reaction between the hydrogen chloride and the surface of the semiconductor material, (e) stopping the flow of gaseous hydrogen chloride, and (f) without removing said crystal element from said chamber, passing a gaseous compound of the semiconductor material over said crystal element to thereby grow an epitaxial semiconductor layer on said surface.

5. The method of claim 4 and in which a masking coating of silicon dioxide is formed on selected portions of said surface of the crystal elements prior to passing said mixture over the heated crystal elements in order to expose predetermined surface areas of the crystal elements to said etching reaction.

6. A method of preparing semiconductor material, including the steps of:

(a) placing a plurality of crystal elements of silicon semiconductor material on a planar support, (b) positioning said support in a closed reaction chamber at an acute angle with respect to a gas flow path through said chamber, (c) heating said plurality of crystal elements at a temperature below the melting point thereof and above 850° C., (d) passing a mixture consisting of from 1.5% to 5.4% by volume of gaseous hydrogen chloride and from 94.6% to 98.5% by volume of hydrogen gas along said flow path and over said heated crystal element in said chamber thereby causing an etching reaction between the hydrogen chloride and the surface of the semiconductor material, (e) stopping the flow of gaseous hydrogen chloride, and (f) without removing said crystal element from said chamber, passing a gaseous mixture of silicon tetrachloride and impurity material over asid crystal element to thereby grow an epitaxial semiconductor layer on said surface.

7. A method of preparing semiconductor material, including the steps of:

(a) placing a plurality of crystal elements of germanium semiconductor material on a planar support, (b) positioning said support in a closed reaction chamber at an acute angle with respect to a gas flow path through said chamber, (c) heating said plurality of crystal elements at a temperature below the melting point thereof and above 700° C., (d) passing a mixture consisting of from 1.5% to 5.4% by volume of gaseous hydrogen chloride and from 94.6% to 98.5% by volume of hydrogen gas along said flow path and over said heated crystal elements in said chamber thereby causing an etching reaction between the hydrogen chloride and the surface of the semiconductor material, (e) stopping the flow of gaseous hydrogen chloride, and (f) without removing said crystal element from said chamber, passing a gaseous mixture of germanium tetrachloride and impurity material over said crystal element to thereby grow an epitaxial semiconductor layer on said surface.

No references cited.

ALEXANDER WYMAN, *Primary Examiner.*